UNITED STATES PATENT OFFICE.

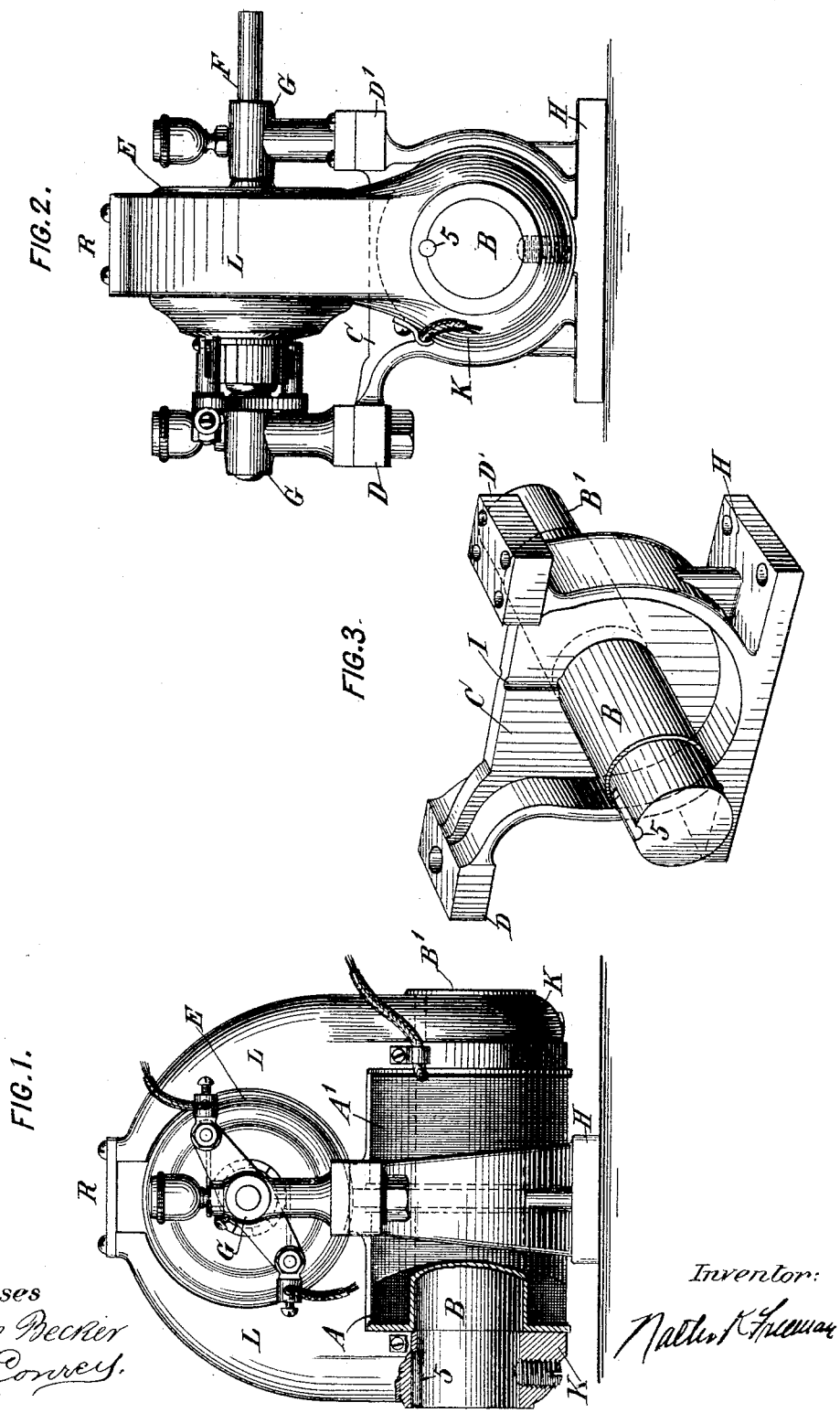

WALTER K. FREEMAN, OF BOSTON, MASSACHUSETTS.

DYNAMO-ELECTRIC MACHINE OR MOTOR.

SPECIFICATION forming part of Letters Patent No. 497,468, dated May 16, 1893.

Application filed November 3, 1892. Serial No. 450,816. (No model.)

*To all whom it may concern:*

Be it known that I, WALTER K. FREEMAN, a citizen of the United States, and a resident of Boston, in the county of Suffolk and State of Massachusetts, have invented a certain new and useful Dynamo-Electric Machine or Motor, of which the following is a specification.

My invention relates to the construction of dynamo electric generators or motors.

The object of the invention is to produce a machine simple and compact, of comparatively light weight, and easy to manufacture.

The invention consists in the novel features of construction and combinations of parts hereinafter described and more particularly specified in the claims.

In the accompanying drawings:—Figure 1, is a side elevation of a machine embodying my invention, a part being shown in section to more fully illustrate the construction. Fig. 2, is an end elevation of the machine. Fig. 3, is a perspective view of the field magnet core piece with the coils and pole pieces removed.

A, A', are the field magnet coils of the machine which coils are preferably wound upon a suitable form and made up into a bobbin adapted to be slipped over the straight core pieces, formed as hereinafter described, though, as will be obvious, the coils might be wound direct upon the core in a lathe.

B, B', is the field magnet core which is made substantially straight as shown and is provided at or about its middle with a lateral flange or projection C, preferably formed or cast in one piece with the core. The two parts B, B', of the core are united end to end in the central plate or flange and extend from the face thereof in opposite directions as shown. The flange or projection C, is provided with projections or enlargements D, D', to form a support for the armature E.

The armature shaft is indicated at F, and may be journaled in bearings G, secured to the projections D, D', or may be otherwise supported on the central flange or plate C, so as to rotate in a plane transverse to the plane of said plate or flange between suitable pole pieces to be presently described.

The flange or plate C, is provided at its bottom with a supporting foot H, by which the whole machine is supported. This foot or base H, may be of any desired form and is preferably cast in one piece with the flange C. The plate or flange C, has preferably a strengthening rib at its edge as indicated although such rib might be dispensed with. On each face of said flange or plate C, is a groove I, to receive the terminals of the bobbins which are connected to one another across said flange.

K, K, are iron collars upon the free end of each projecting core. The bobbins are held between these collars and the central flange or projection C. The collars are made of iron and are extended or prolonged laterally from the core into pole pieces L, L, forming the poles of the field magnet. These pole pieces are presented to the armature as shown over the field magnet bobbins and may be of any suitable shape or form. The collars and the projecting poles constitute in effect removable and attachable pole pieces. The collars are prevented from turning upon the cores by suitable keys key-ways for which are indicated at 5, in the end of the core. The collars and pole pieces may be secured upon the ends of the core simply by the bridge plate R, of non-magnetic material uniting the terminals of the pole pieces, or may be fastened in any other suitable way. The collars are made to fit as accurately as possible upon the end of the core for forming good magnetic circuit.

What I claim as my invention is—

1. In a dynamo electric machine or motor, a substantially straight field magnet core having a lateral flange or projection at or about its middle forming a support for the armature, field magnet pole pieces secured upon its opposite ends, and field magnet coils secured between said pole pieces and the lateral projection.

2. In a dynamo electric machine or motor, a field magnet support consisting of an iron plate having straight core projections extending from the face thereof in opposite directions therefrom, in combination with a field magnet bobbin on each projection, and an iron collar secured upon the end of each core projection over the bobbin and extended or prolonged laterally from the core to form a pole piece, as and for the purpose described.

3. In a dynamo electric machine or motor, a field magnet having a pair of straight iron cores united end to end in a central plate or flange provided with supports for the armature and with a foot or base.

4. In a dynamo electric machine or motor, the combination, substantially as described, of the straight core, the intermediate plate formed in one piece with them and in which they are united end to end, a support for the machine cast in one piece with said plate, pole pieces secured upon the free ends of said cores, and an armature suitably supported upon the intermediate plate and rotating between said pole pieces.

5. In a dynamo electric machine or motor, the field magnet having its core piece sustained from a central pillar or support forming the magnetic connection between the ends of the cores and from which said core projects in opposite directions, said standard or pillar constituting the base or support of the machine and also being provided at its top with suitable supports for the armature of the machine.

6. In a dynamo electric machine or motor, a plate (C) having field core pieces projecting in opposite directions from its two faces, and provided at its top with projections (D) to support the armature and at its bottom with a foot or projection to form a support for the machine.

7. In a dynamo electric machine or motor, the combination, substantially as described, with the straight iron field magnet core B, B', of iron collars fitting on the ends of said core and extended laterally into pole pieces of the machine, a bridge or tie piece (R) uniting said pole pieces, and an armature mounted over the field magnet core and supported upon a lateral projection extending from the said core at or about its middle.

Signed at New York, in the county of New York and State of New York, this 15th day of October, A. D. 1892.

WALTER K. FREEMAN.

Witnesses:
WM. H. CAPEL,
THOS. F. CONREY.